US005717187A

United States Patent [19]

Rogozinski et al.

[11] Patent Number: 5,717,187

[45] Date of Patent: Feb. 10, 1998

[54] PLASMA TORCH CONDITION MONITORING

[75] Inventors: Maciej Wlodzimierz Rogozinski, Bulleen; Subramania Ramakrishnan, Balwyn North; Ashley Grant Doolette, Wishart, all of Australia; Nicholas A. Sanders, Norwich, Vt.; Richard W. Couch, Jr., Hanover, N.H.

[73] Assignee: Commonwealth Scientific and Industrial Research Organisation, Australia

[21] Appl. No.: 716,264

[22] PCT Filed: Mar. 24, 1995

[86] PCT No.: PCT/AU95/00164

§ 371 Date: Sep. 24, 1996

§ 102(e) Date: Sep. 24, 1996

[87] PCT Pub. No.: WO95/26251

PCT Pub. Date: Oct. 5, 1995

[30] Foreign Application Priority Data

Mar. 25, 1994 [AU] Australia ................................ PM 4709

[51] Int. Cl.[6] ...................................................... B23K 10/00

[52] U.S. Cl. ................................ 219/121.54; 219/121.55; 219/121.51; 219/121.59

[58] Field of Search .......................... 219/121.56, 121.55, 219/121.54, 121.48, 121.51, 74, 75, 121.59

[56] References Cited

U.S. PATENT DOCUMENTS

| | | | |
|---|---|---|---|
| 4,476,373 | 10/1984 | D'Antonio | 219/121.54 |
| 4,621,184 | 11/1986 | Vancata . | |
| 4,663,515 | 5/1987 | Kneeland et al. | 219/121.54 |
| 4,767,908 | 8/1988 | Dallavalle et al. | 219/121.5 |
| 4,775,774 | 10/1988 | Caneer, Jr. | 219/121.55 |
| 5,225,658 | 7/1993 | Yamaguchi . | |
| 5,326,955 | 7/1994 | Nishi . | |

FOREIGN PATENT DOCUMENTS

| | | |
|---|---|---|
| 0 213689 | 3/1987 | European Pat. Off. . |
| 0 508481 | 10/1992 | European Pat. Off. . |
| 62-127173 | 6/1987 | Japan . |
| 1-030200 | 2/1989 | Japan . |
| 6-4195 | 1/1994 | Japan . |

*Primary Examiner*—Mark H. Paschall
*Attorney, Agent, or Firm*—Ladas & Parry

[57] ABSTRACT

A method and apparatus for monitoring the condition of a plasma arc torch determines whether the nozzle (13) of the torch and an electrode (11) of the torch have suffered any erosion and distinguishes the two. The pressure of a plasma forming gas that is supplied for the torch ($p_1$ or $p_n$) is monitored while the torch is operating to detect erosion of the orifice (12) of the nozzle (13), and the voltage $U_{ne}$ between the electrode (11) and nozzle (13) is monitored, also while the torch is operating, to detect erosion of the electrode (11). A pressure, $p_1$ or $p_n$ below a reference pressure indicative of a good (un-eroded) nozzle indicates erosion of the orifice (12), and a voltage $U_{ne}$ above a reference voltage indicative of a good (un-eroded) electrode indicates erosion of the electrode. The pressure measurement and $U_{ne}$ are compared with appropriate reference values to logically discriminate between wear of the nozzle and wear of the electrode (given that an increase in $U_{ne}$ due to electrode wear is opposed by a decrease in $U_{ne}$ due to nozzle wear). The apparatus and method may provide a binary "good" or "bad" output for the nozzle and electrode, respectively, or may allow for the degree of wear of each to be determined.

16 Claims, 15 Drawing Sheets

STRAIN GAGE BRIDGE PRESURE SENSOR
$U_{dc}$
$U_p$
30
DIFFERENTIAL AMPLIFIER
31
32
LOW PASS FILTER AND VOLTAGE OFFSET ADJUSTMENT
33
VOLTAGE COMPARATOR
p $U_o$
"1"
"0"
$U_l$ 11
13
R1
R2
$U_{ne}$ $U_{ne}$
35
36
ISOLATION AMPLIFIER
37
ELECTRODE REFERENCE POTENTIAL
38
LOW PASS FILTER AND VOLTAGE OFFSET ADJUSTMENT
39
VOLTAGE COMPARATOR
40
VOLTAGE COMPARATOR
$U_{neH}$
$U_{neL}$

PLASMA TORCH CONDITION MONITORING

TECHNICAL FIELD

This invention relates to a method and apparatus for monitoring the condition of a plasma arc torch and is directed in particular towards determining whether a nozzle of the torch has undergone any "axisymmetric" wear and distinguishing between electrode wear and nozzle wear. Plasma arc torches to which the invention is applicable may be used for example for cutting metallic sheets or plates in metal fabrication, or in material spraying or waste destruction systems. The invention will be described hereinafter in relation to a plasma arc cutting torch, but it is to be understood that the application of the invention is not limited to such a cutting torch.

BACKGROUND

Plasma arc cutting processes make use of the heat and momentum of a high velocity plasma jet to sever materials by the dual actions of melting as well as vaporization and material displacement along the jet path. The melting and vaporization of the material relies on the heat from the plasma jet and from an electric arc established between an electrode of the plasma torch and the workpiece (that is, a transferred arc system), or between two electrodes in the torch (that is, a non transferred arc system).

A typical plasma cutting system comprises a plasma cutting torch, power supply, arc igniter and consumables such as plasma and shield gases as well as torch coolant. The plasma torch can be hand held or can be mounted on a contouring machine such as a planar profiling machine, a three axis gantry or an articulated robotic manipulator. The plasma cutting torch includes an electrode (typically the cathode) centered above an orifice in a constricting nozzle. A suitable plasma forming gas flows under pressure around the electrode and through the nozzle orifice towards the workpiece. The arc is constricted by the nozzle and can be further constricted by shielding gas or water. An arc igniter is used to establish a pilot arc between the electrode and the nozzle and subsequently, under the influence of a strong gas flow, this arc transfers to the workpiece (in a transferred arc torch) and the pilot arc is extinguished.

The quality of the cut made with a plasma arc torch (which is determined by factors such as the dimensional accuracy of the cut parts, cut angle (degree of squarenesss of the cut face), sharpness of the bottom and top edges of the part, roughness of the cut face, amount of dross on the bottom of the plate (workpiece), amount of splatter on the top of the plate etc.,) is extremely sensitive to the condition of the torch and in particular to the condition of its nozzle and electrode, which are consumable parts. Presently, an operator usually visually supervises the cutting operation and stops cutting if the quality of the cut deteriorates. Such visual inspection of the cutting process is very cumbersome due to extreme brightness of the plasma arc, presence of metallic fumes, cut parts remaining in the workpiece plate until the cutting is completed for a given plate and often under-water or water-muffler cutting. Alternatively, the torch may be inspected by the operator in an off-line mode, either periodically or after deterioration of the cut quality has been observed. In order to increase the degree of autonomy of a plasma cutting system, increase its reliability and consistency of the cut quality as well as reduce material waste, a method and an apparatus which are suitable for automatically testing and monitoring the condition of the torch are needed.

Condition monitoring is concerned with determining the type and degree of wear of consumable parts of a plasma arc torch, in particular the type and degree of erosion of the nozzle around the orifice and of the degree of erosion of an electron emitting element embedded in the electrode. For the nozzle, the following types of erosion can be distinguished:

(i) grooves on the outside of the nozzle around the orifice,
(ii) approximately axisymmetric chamfer on the outside and/or inside of the nozzle around the orifice,
(iii) enlargement of the orifice diameter (also an approximately axisymmetric wear).

A combination of the above types of erosion often occurs. For example, wear of type (ii) and (iii) occurs after prolonged torch operation. On the other hand, erosion of type (i) may result from double arcing (a phenomenon in which the arc is established between the electrode and the nozzle and the nozzle and the workpiece) or from prolonged pilot arc attachment at the nozzle. Double arcing can cause grooving of the outside nozzle surface around the orifice within a fraction of a second. Since the occurrence of the above phenomena depends on external conditions, the life-time of the nozzle may vary significantly and is unpredictable.

Nozzle erosion disturbs plasma gas flow and affects the cutting process. For example, erosion of type (i) causes deflection of the plasma jet in the direction of the groove. This leads to dimensional inaccuracy of the cut part and variation of the cut angle and of the amount of dross at the bottom of the workpiece plate along the part.

For a good nozzle and under correct process conditions most of the molten material is removed in a direction normal to the workpiece and practically no dross is formed. However erosion of type (ii) or (iii) causes the pressure in the nozzle chamber to decrease and affects the mechanism of material removal resulting in dross formation at the bottom of the plate. That is, not all of the material is blown away and some of the molten material solidifies underneath the workpiece forming hard to remove dross. In extreme situations loss of cut can occur due to a lack of full material penetration by the plasma jet.

Erosion of the torch electrode can also occur. This involves gradual removal of the electron emitting material from an electron emitting insert in the electrode. This type of wear increases the arc length and therefore arc voltage, which alters the amount of power delivered to the workpiece and affects cut quality. Also, if automatic torch height control is used which utilises arc voltage as the controlled variable, the height control regulator will counteract the voltage increase by decreasing the torch standoff and may eventually drive the torch into the workpiece.

Plasma arc torch condition monitoring can be used to increase the degree of autonomy of plasma cutting systems in mechanised operations. Thus it can be utilised to signal faulty cutting conditions to an operator, stop the cutting operation and initiate automatic torch or consumables change. Such condition monitoring can increase productivity and efficiency and decrease the overall cost of mechanised plasma cutting operations.

DISCLOSURE OF THE INVENTION

It is an object of the present invention to provide a method and apparatus for detecting axisymmetric wear of a nozzle (that is, erosion of types (ii) and (iii) described above) which are suitable for including in an on-line or off-line monitoring arrangement for the torch. Secondary objects of the invention are to detect electrode wear and distinguish between such electrode wear and axisymmetric wear of the nozzle. Monitoring for erosion of type (i), that is, "non axisymmetric wear", is the subject of the applicant's co-pending application, filed concurrently with the present application, entitled Detecting Non Symmetrical Nozzle Wear in a Plasma Arc Torch, the disclosure of which is incorporated herein by this cross reference.

According to a first aspect of the invention there is provided a method for detecting erosion of a nozzle of a plasma arc torch while a plasma jet is being generated by the torch including measuring the pressure of a plasma forming gas supplied to the torch at a location upstream of the nozzle orifice, comparing the measured pressure with a reference pressure value representative of a non eroded nozzle, wherein a measured pressure value which is less than said reference value indicates the presence of erosion of the nozzle orifice.

Preferably the invention includes additional steps for detecting wear of an electrode of the plasma arc torch. In these additional steps an electrical parameter associated with the plasma jet is measured to determine, from a comparison between said measured electrical parameter and a reference value, whether a change in length of the arc is indicated. If a change in length of the arc is indicated, it is possible, from the measured pressure value and the measured electrical parameter, to distinguish whether erosion of the nozzle or erosion of the electrode is present.

According to a second aspect of the invention there is provided apparatus for detecting erosion of a nozzle of a plasma arc torch while a plasma jet is being generated by the torch including means for measuring the pressure of a plasma forming gas supplied to the torch at a location upstream of the nozzle orifice and means for comparing a measured pressure value determined by said first mentioned means with a reference pressure value representative of a non eroded nozzle, wherein a measured pressure value which is less than said reference value indicates the presence of erosion of the nozzle orifice.

The apparatus preferably furthermore includes means for measuring an electrical parameter associated with the plasma jet and for comparing said measured electrical parameter with a reference value to determine whether a change in length of the arc is indicated.

Preferably the electrical parameter that is measured is voltage, in particular the electrode to nozzle voltage.

Effectively, the electrical parameter associated with the plasma jet is the plasma potential at a given point between the electrode and the workpiece. Changes in the plasma potential are reflected in the potential of an electrical probe. Where the electrode to nozzle voltage is measured, the nozzle acts as a probe for measuring the plasma potential, which potential increases with wear of the electrode due to the concomitent lengthening of the arc.

BRIEF DESCRIPTION OF THE DRAWINGS

Embodiments of the invention will now be described, by way of example only, with reference to the accompanying drawings in which.

DETAILED DESCRIPTION OF EMBODIMENTS INCLUDING BEST MODE FOR CARRYING OUT THE INVENTION

In the following description, all tests were conducted using a Hypertherm MAX200 Plasma Arc Cutting System with Machine Torch having components for 100 A current and air plasma and air shield gas. This equipment is available from Hypertherm, Inc. of Hanover, N.H., United States of America.

Figure 1:
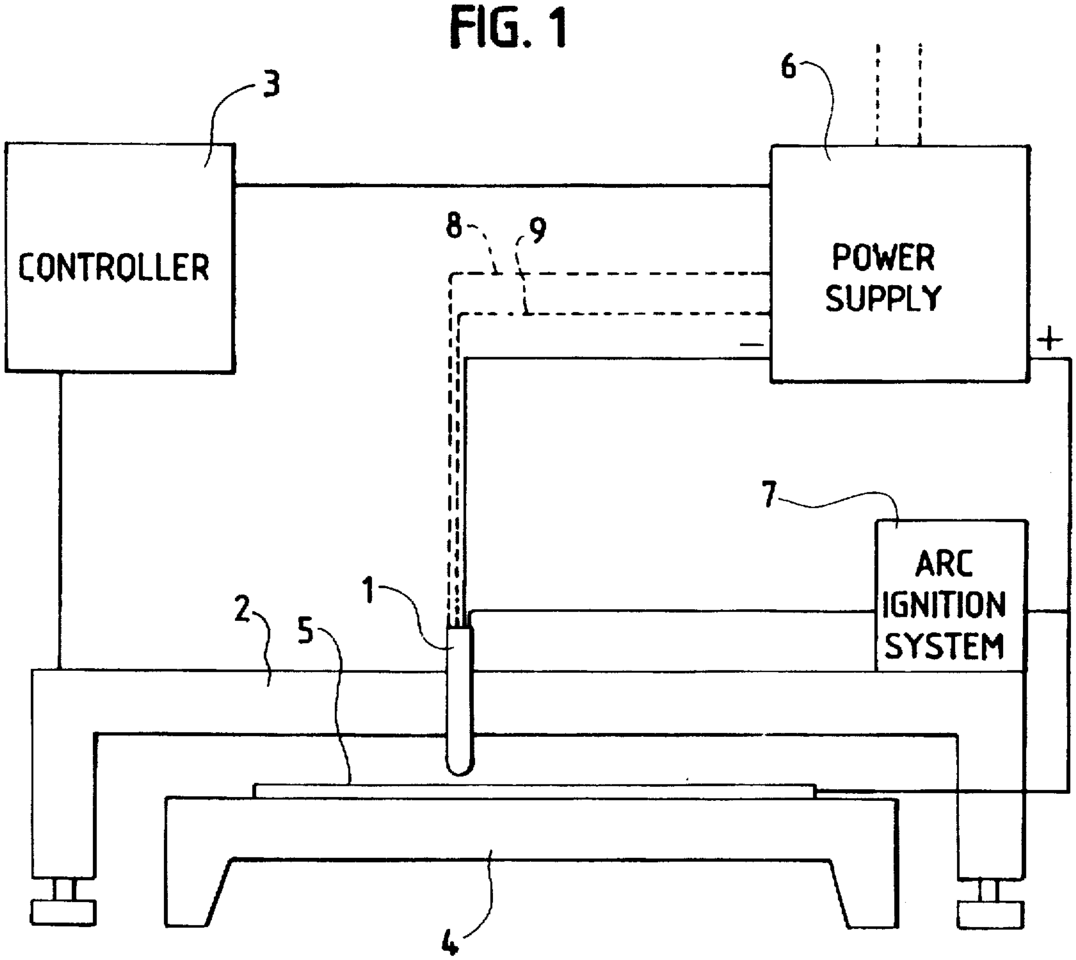
FIG. 1 illustrates a typical mechanised plasma cutting system using a plasma arc torch.

Referring to FIG. 1, a typical mechanised plasma arc cutting system comprises a plasma arc cutting torch 1 mounted on the gantry 2 of a planar profiling machine. The gantry movement is controlled by computerised controller 3 over a cutting table 4 on which a workpiece 5 is supported. An electrical power supply 6 provides voltages and current for operation of the plasma arc torch and arc ignition system 7 (typically a high frequency high voltage generator). Plasma and shield gases 8 and coolant 9 for the torch may be supplied by appropriate control means such as pumps and valves (not shown) associated with the power supply 6.

Figure 2:
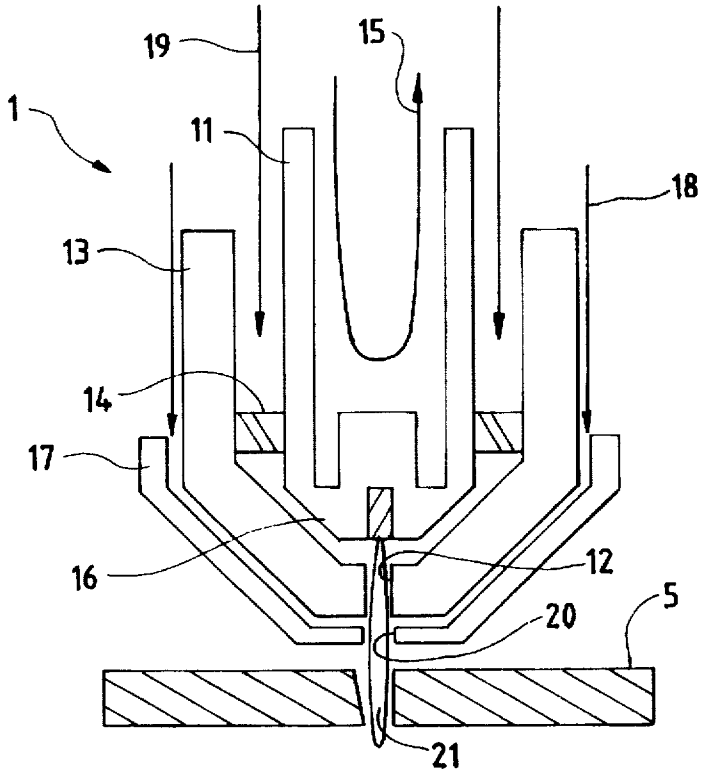
FIG. 2 illustrates the parts of a typical plasma cutting torch.

Details of a plasma arc cutting torch 1 of the FIG. 1 arrangement are shown in FIG. 2. The torch comprises an electrode 11, which is typically but not necessarily the cathode, centered above an orifice 12 in a constricting nozzle 13. Electrode 11 will usually be made of copper and has an electron emitting insert 16 in its tip. The electron emitting insert may be made of a material such as hafnium, zirconium or tungsten depending on the plasma forming gas which is used. The electrode may also be cooled, for example by circulation of a coolant 15 such as water, to reduce its wear. A plasma forming gas 19 such as air, oxygen, nitrogen or a mixture of argon and hydrogen is supplied under pressure to flow around the electrode 11 between the electrode and nozzle 13 and through the orifice 12 towards a workpiece 5. Nozzle 13 is also usually made of copper and may be cooled (for example by circulation of a coolant (not shown) to reduce its wear). The plasma forming gas 19 may pass through a swirl ring 14 which improves squareness of the cut on the part side of the workpiece.

The arc (and associated plasma jet) 21 is constricted by the nozzle 13 and can be further constricted by shielding gas 18 (or a shielding liquid, for example water) which is directed to the arc region by a shield 17 with the shielding gas 18 (or a shielding liquid) being supplied to a space between the nozzle 13 and shield 17. Shield 17 contains an orifice 20 for passage of the arc and plasma jet 21 and surrounding shielding gas. Shield 17 is also usually made of copper.

The condition of the nozzle 13 and electrode 11 of a plasma torch 1 can be determined from measurement of the plasma forming gas pressure and the voltages present between various parts of the torch and the workpiece with the arc established between the electrode 11 and a workpiece 5. That is, parts of the plasma cutting torch are used as electrical probes for measurement of characteristics of the plasma jet. Thus the nozzle 13 and the shield 17 of the torch may be used to monitor the status of the plasma generated by the cutting torch.

Figure 3:
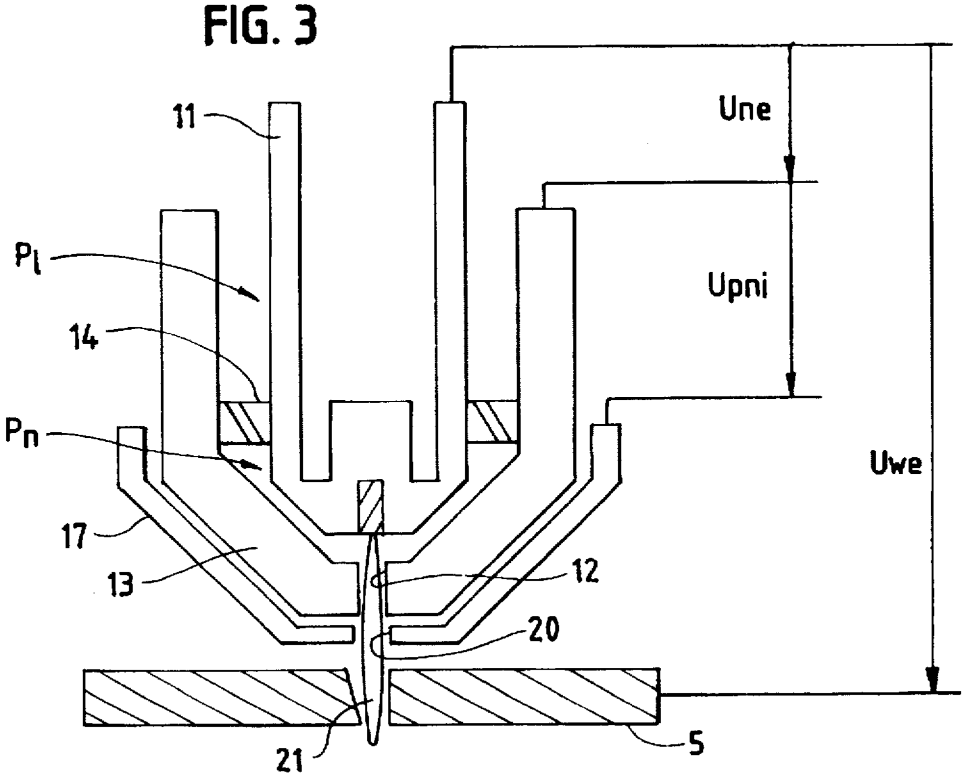
FIG. 3 illustrates pressure and voltage measurements that may be made according to embodiments of the invention.

The following quantities are measured (see FIG. 3):

(a) Voltage between electrode 11 and workpiece 5, $U_{we}$;

(b) Voltage between electrode 11 and nozzle 13, $U_{ne}$;

(c) Voltage between nozzle 13, (or the electrode) and the segments of a segmented probe placed between the nozzle and the workpiece ($U_{pni}$ for i=1 . . . m where m is the number of the segments; [a segmented probe construction and its utilisation for detecting nozzle wear is the subject of the applicant's above-mentioned co-pending application].

(d) Pressure in the plasma gas line (between a pressure regulator typically located in the plasma cutting equipment power supply and the swirl ring 14, $p_l$). Pressure in the nozzle chamber can also be measured instead of that in the line (see $p_n$ in FIG. 3) but measurement of $p_l$ is more convenient because of easier sensor installation.

The effect of axisymmetric wear on cut quality is independent of the torch's orientation with respect to the cutting direction, thus detection of this type of wear does not require a probe with directional sensitivity as in the applicant's above-mentioned co-pending application.

Figure 4:
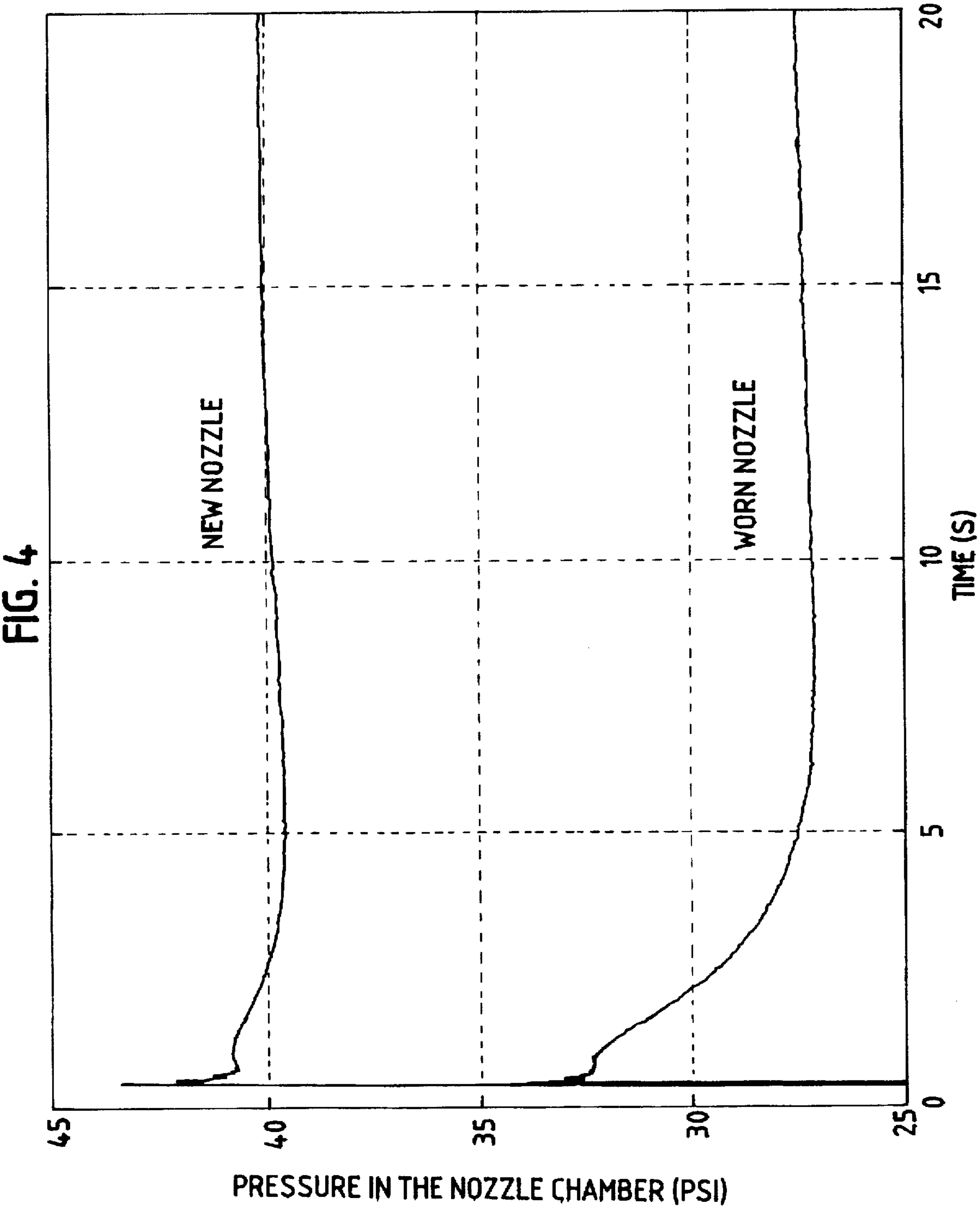
FIGS. 4 and 5 are graphs illustrative of pressure measurements for detecting a worn nozzle.
Figure 5:
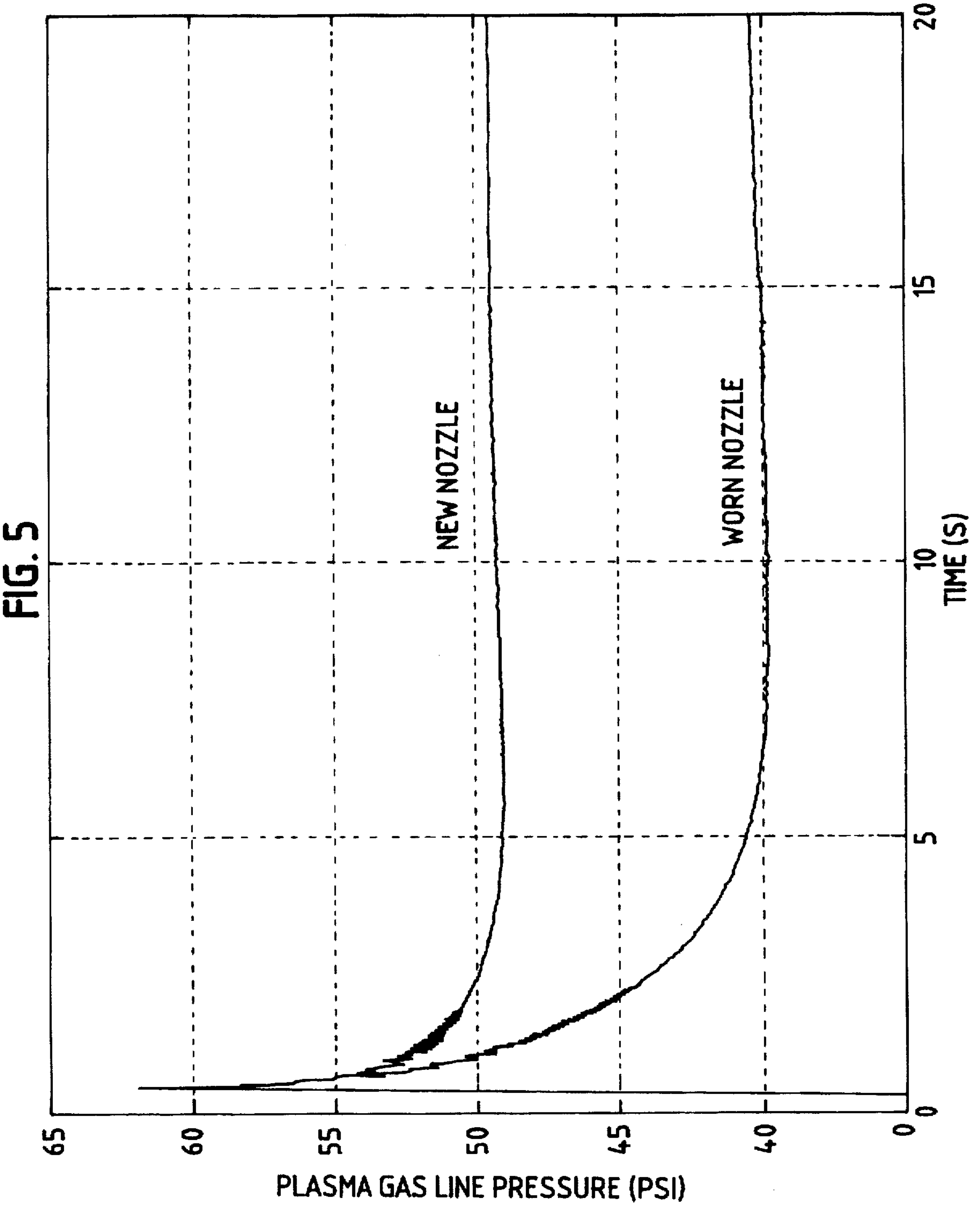

The presence of an arc column 21 between electrode 11 and workpiece 5 reduces the effective area of orifice 12 which is available for flow of the plasma gas 19, thus increasing pressure in the nozzle chamber in comparison to the pressure associated with no arc. However, this increase is smaller for a nozzle having axisymmetric erosion than for a nozzle without this type of erosion because of increased plasma gas mass flow in the former case. This difference in pressure is shown in FIG. 4 for pressure measurements, $p_n$, in the nozzle chamber, that is, downstream of a swirl ring 14. Pressure dependency on nozzle condition can also be observed in the plasma gas line between a swirl ring 14 in the torch and a pressure regulator (not shown) in the plasma cutting equipment power supply (see FIG. 5). Measurement of pressure in the plasma gas line, $p_l$, is more convenient than measurement of the pressure in the nozzle chamber, $p_n$, because of easier sensor installation in the former case.

Plasma gas pressure measurement is utilised to determine if the nozzle has wear of type (ii) or (iii), that is, axisymmetric erosion. If the measured pressure is lower than a threshold value corresponding to a nozzle without axisymmetric wear, then the nozzle has erosion of type (ii) and/or (iii).

Electrode erosion shows as a concave pit in the electron emitting material 16 (e.g. hafnium or zirconium insert) occurring after prolonged use of the electrode 11. On average, an erosion depth of about 0.6 mm can be observed in a Hypertherm electrode after about 120 cutting cycles operating with oxygen or air (Richard W. Couch Jr., Lifeng Luo, Nicholas A. Sanders, Swirl ring and flow control process for a plasma arc torch, Patent AU-B-77814/91). Generally, the electrode erodes quicker when it is used with reactive gases (such as oxygen and air). Hypertherm recommends electrode replacement when the erosion depth is approximately 1.5 mm and 2 mm for the MAX100 and MAX200 torches, respectively.

Figure 6:
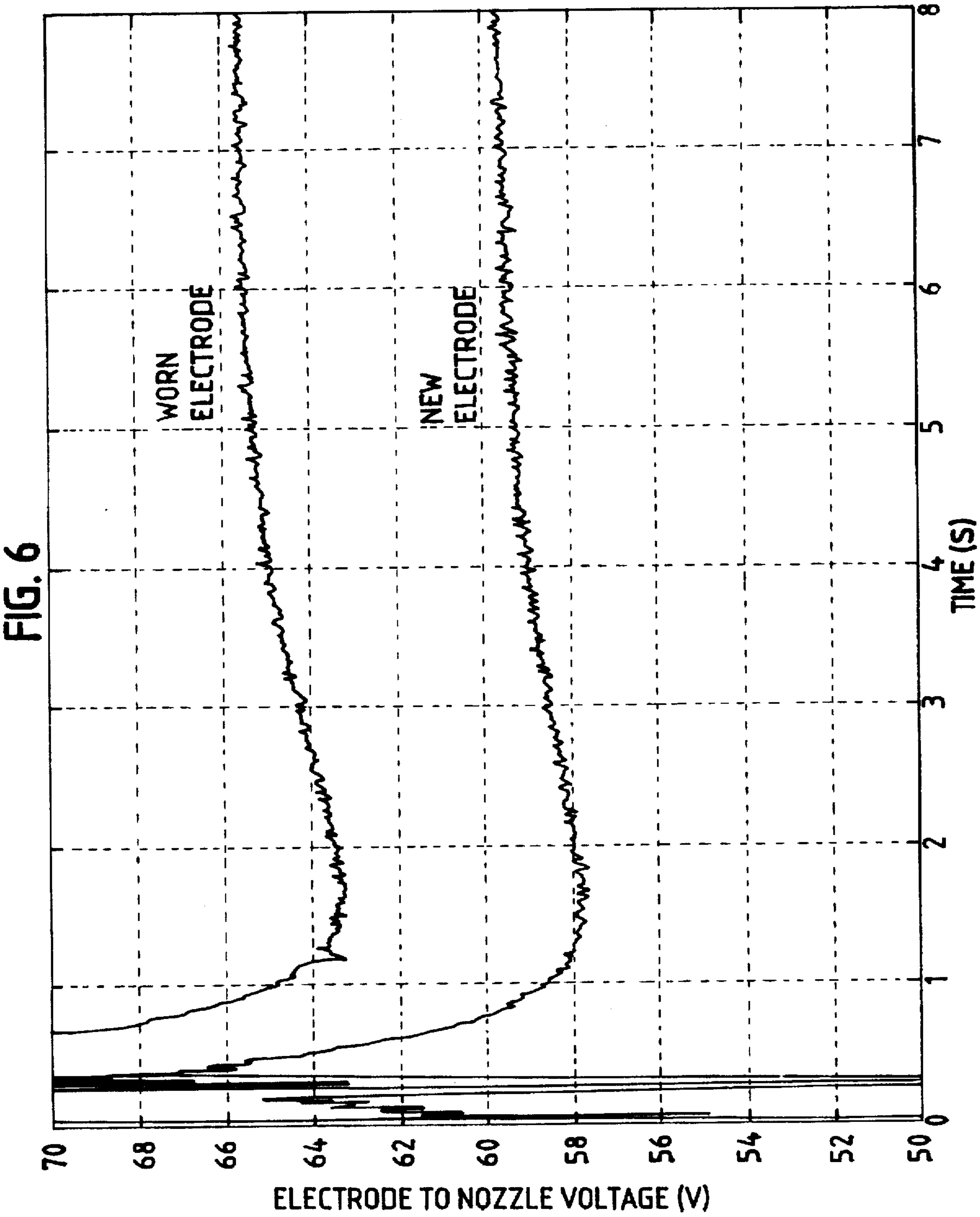
FIG. 6 is a graph illustrative of electrode to nozzle voltages for detecting a worn electrode.

For a torch undergoing electrode erosion, the distance between the electrode arc root attachment (at insert 16) and nozzle 13 increases. This means that the effective arc length increases which results in a corresponding increase in the electrode to nozzle voltage $U_{ne}$. The advantage of measuring the electrode to nozzle voltage (rather than the electrode to workpiece voltage) is that $U_{ne}$ is independent of downstream operations, that is piercing, cutting or having the arc established between the electrode and a non-penetrable workpiece. Furthermore, $U_{ne}$ is independent of the torch standoff, that is, the torch to workpiece distance. The increase in $U_{ne}$ with electrode wear is about 5 volts per 1 mm increase in the depth of the electrode cavity that is formed by erosion of the insert 16. Electrode to nozzle voltages for a good and worn electrode with a good nozzle are depicted in FIG. 6 (the electrode erosion depth=1.05 mm).

Figure 7:
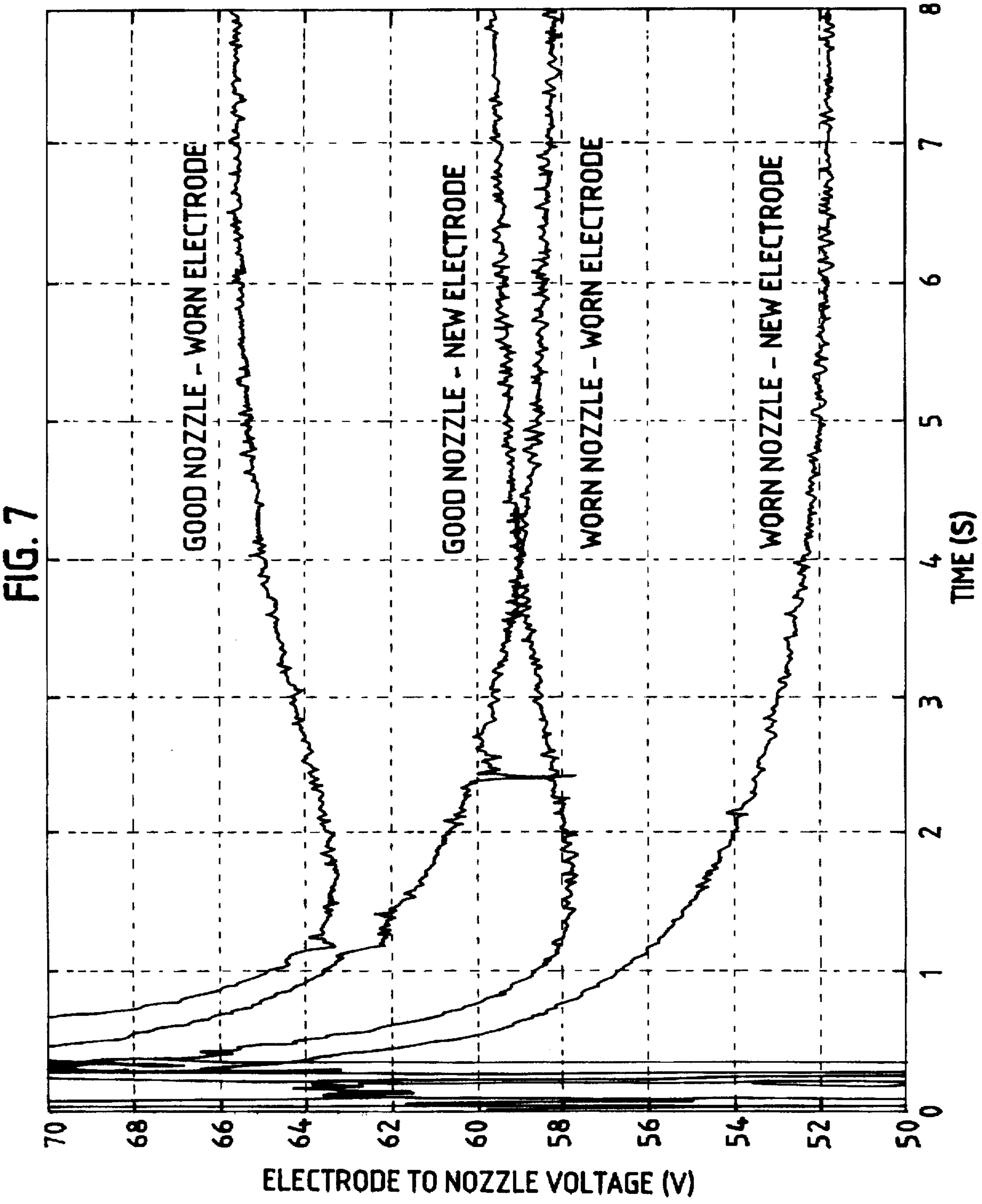
FIG. 7 is a graph illustrative of electrode to nozzle voltages for different combinations of wear of the nozzle and electrode.

The increase in $U_{ne}$ with electrode wear is opposed by a decrease in $U_{ne}$ due to nozzle erosion of type (ii) and (iii). For a nozzle with wear types (ii) and/or (iii), the effective diameter of the arc increases thus causing $U_{ne}$ to decrease (that is, plasma resistance decreases with increasing plasma cross-sectional area). This effect is shown in FIG. 7, which shows that it may not be possible to distinguish between the case of a nozzle with wear of type (ii) and/or (iii) and a worn electrode and the case of a nozzle without such wear and a good electrode. However the plasma forming gas pressure can be used to distinguish these two cases. Thus in the case where pressure is lower than a threshold value $U_l$ corresponding to a nozzle without axisymmetric wear, indicating the nozzle has erosion of type (ii) and/or (iii), if the electrode to nozzle voltage $U_{ne}$ is lower than a threshold value $U_L$, then the electrode is good. However, if $U_{ne}$ is greater than the threshold value $U_L$, then the electrode is worn. On the other hand, if the pressure is higher than the threshold value, then the nozzle is free of erosion of type (ii) or (iii). In this case, if $U_{ne}$ is greater than $U_L$ but smaller than a threshold value $U_H$, then the electrode is good as well. However, if $U_{ne}$ is greater than $U_H$, then the electrode is worn out. The two threshold values $U_L<U_H$ are introduced because three regions for the values of $U_{ne}$ are needed, corresponding to the cases: (1) worn nozzle—good electrode, (2) good nozzle—good electrode or worn nozzle—worn electrode, and (3) goad nozzle—worn electrode. Values for $U_L$ and $U_H$ are determined experimentally as is described below.

Figure 8:
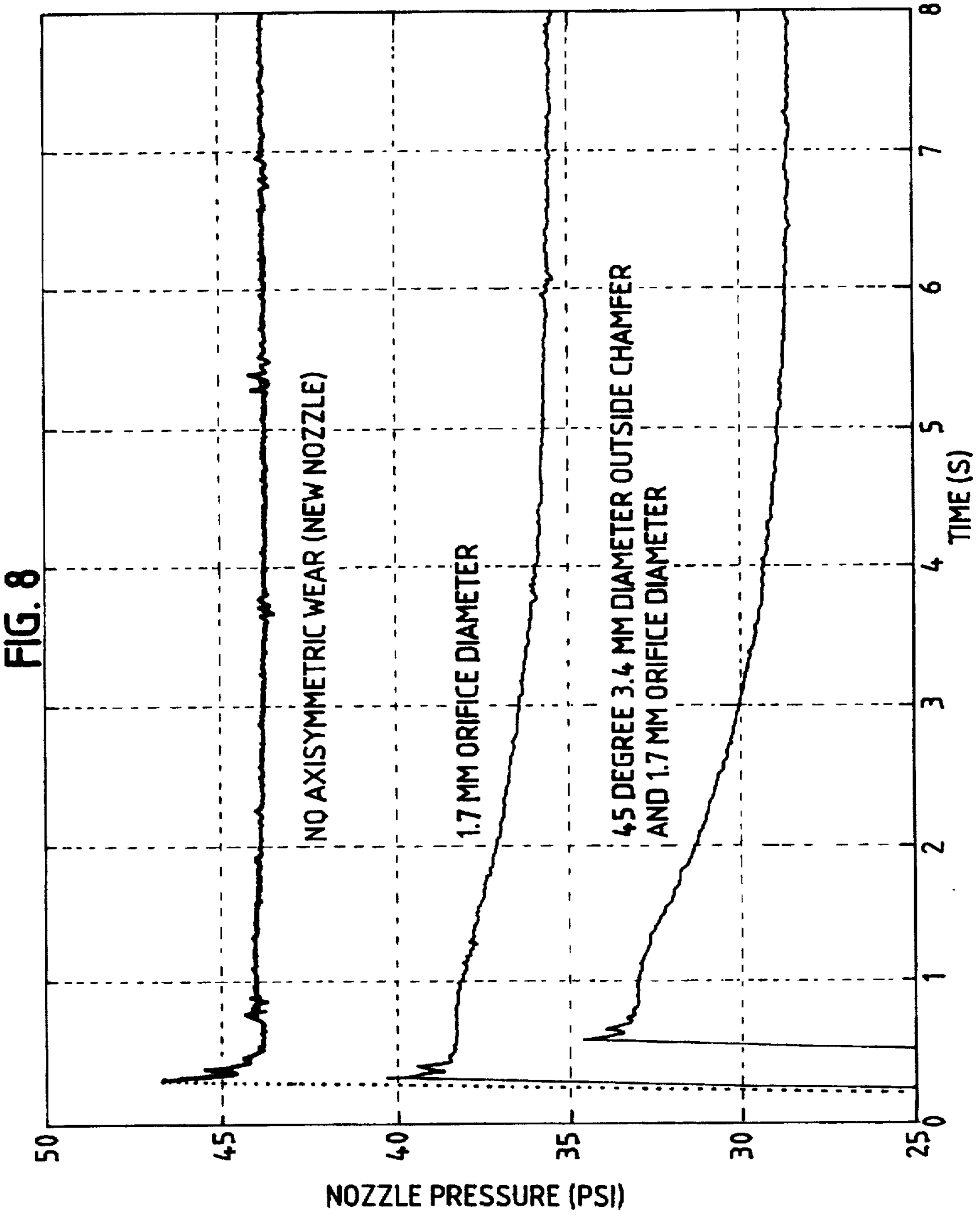
FIGS. 8 and 9 are graphs illustrating the effect of nozzle and electrode wear on nozzle pressure.
Figure 9:
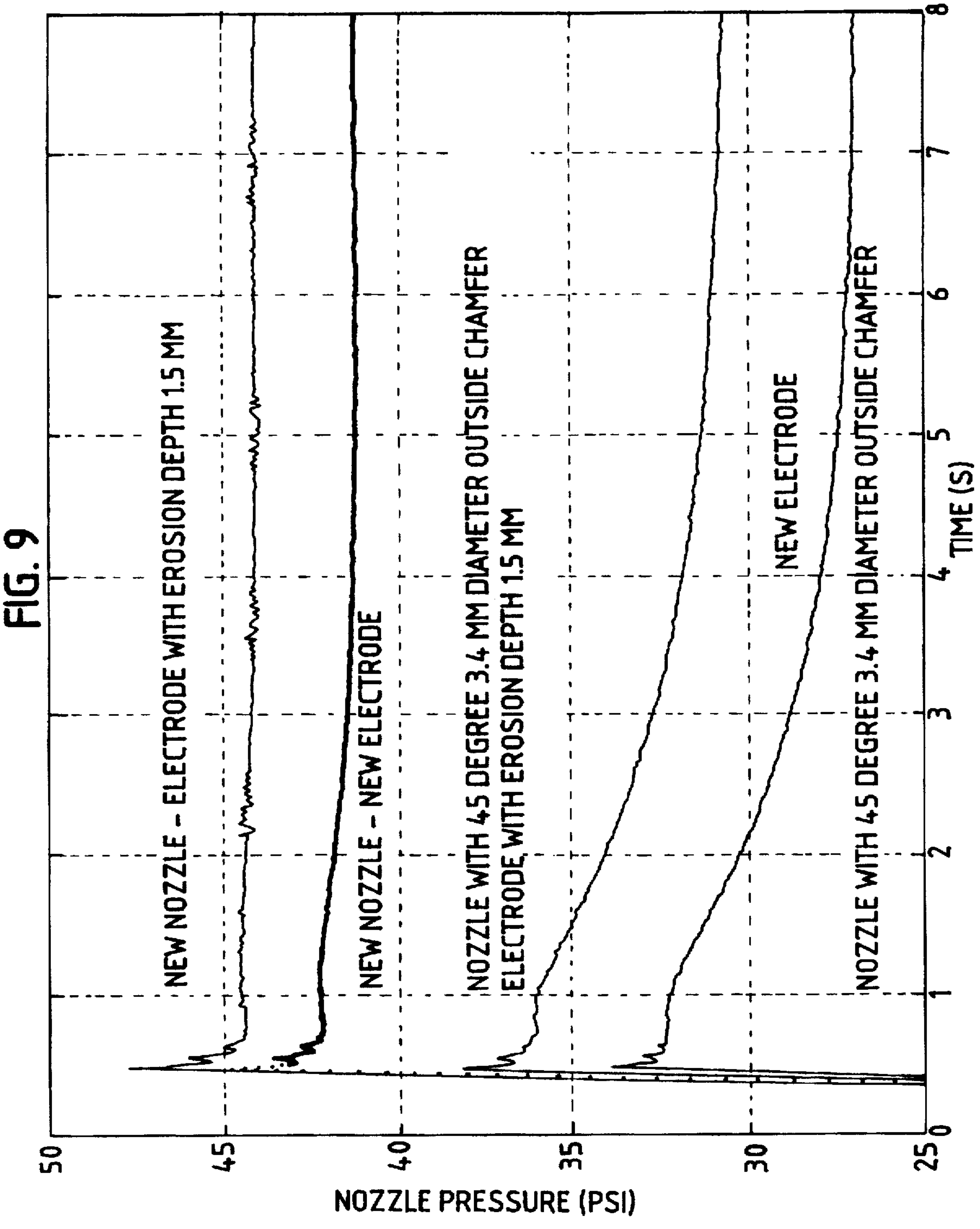

The degree of any axisymmetric nozzle wear can be determined from the measurement of pressure in the nozzle chamber, $p_n$, or in the plasma gas line, $p_l$. The pressure in the nozzle chamber or in the plasma gas line decreases with increasing axisymmetric nozzle wear. This is illustrated in FIG. 8. The pressure is only weakly dependent on the electrode wear, as shown in FIG. 9.

Figure 10:
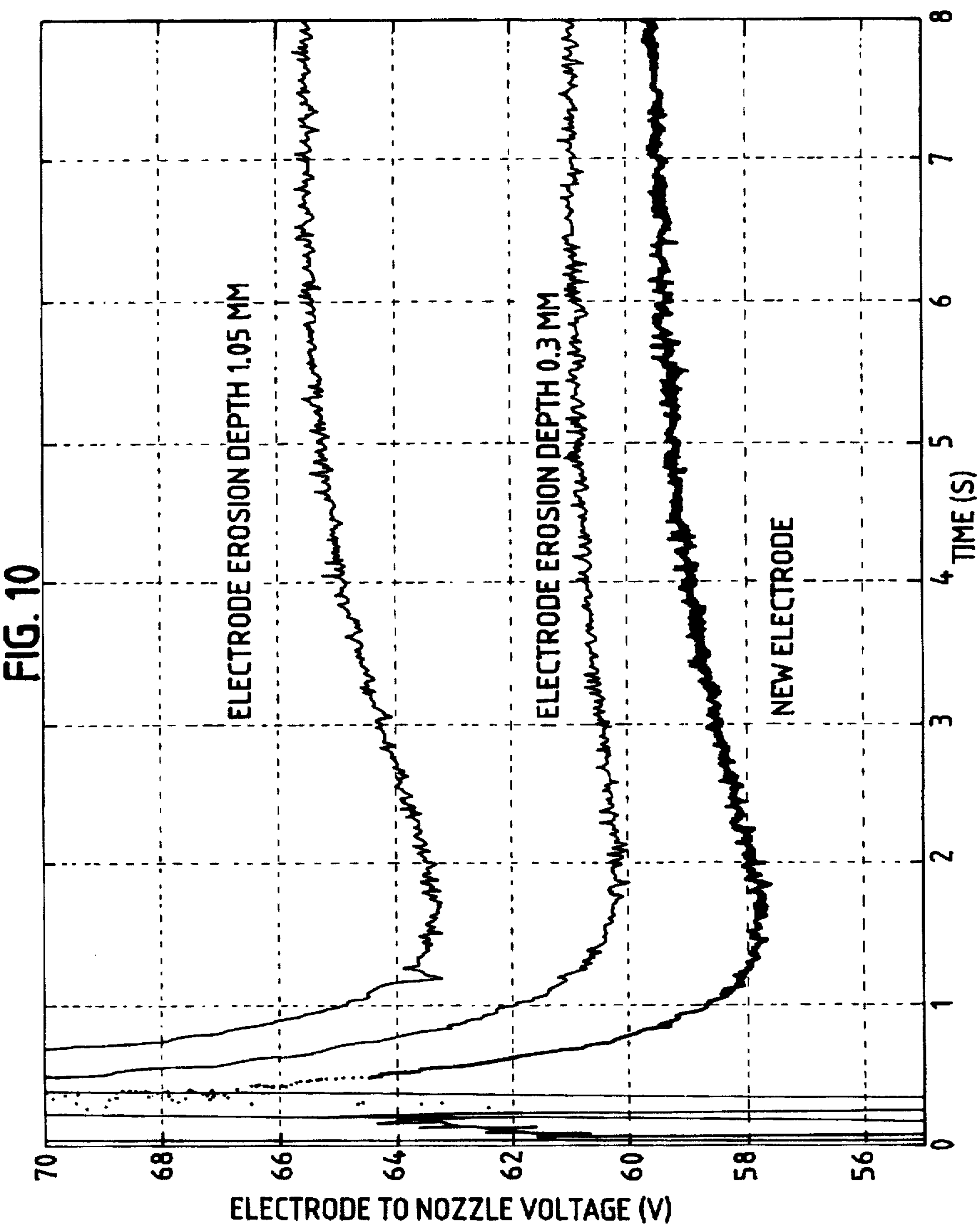
FIGS. 10 to 13 are graphs illustrating the effects of different degrees of wear on electrode to nozzle voltage.
Figure 11:
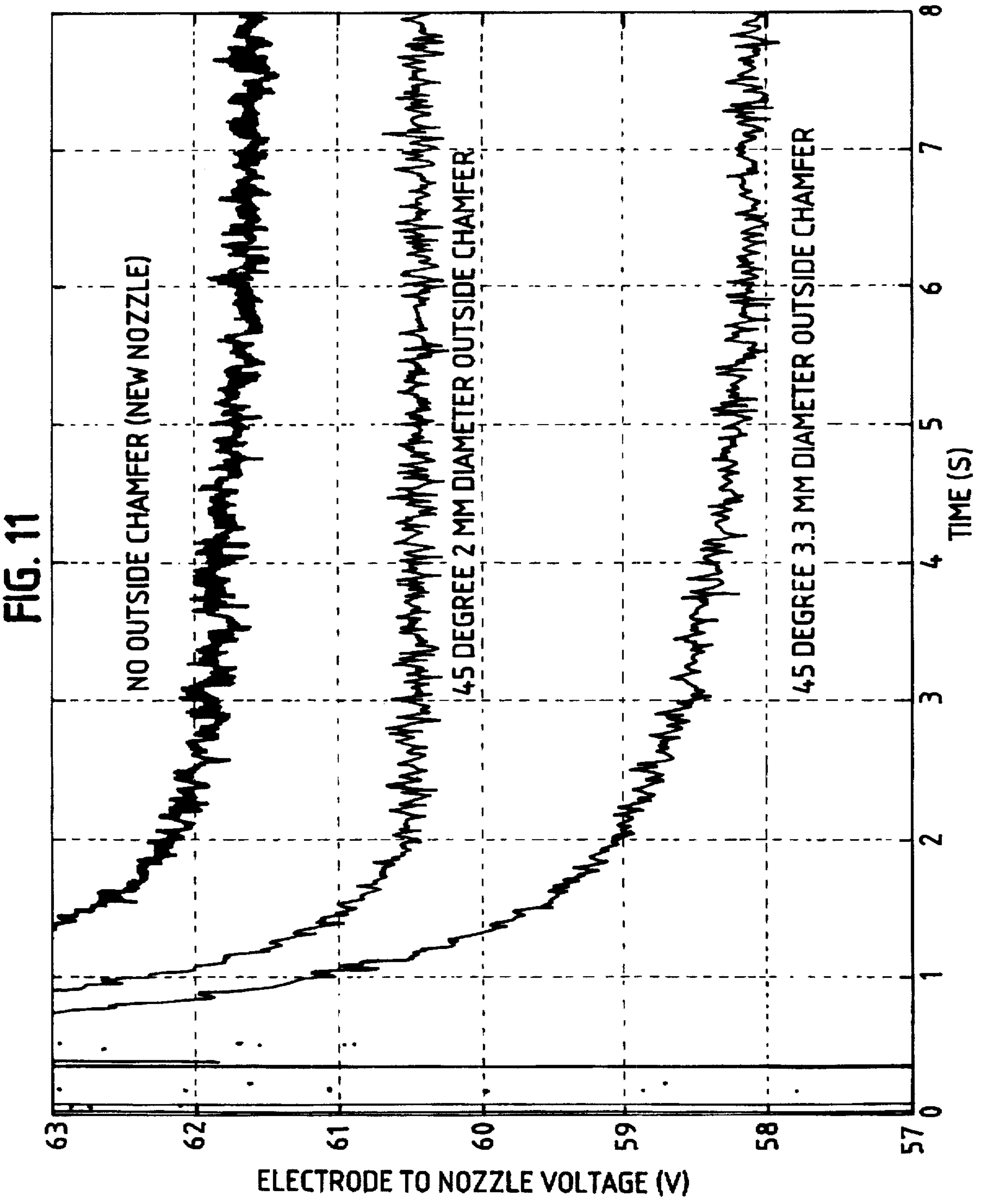
Figure 12:
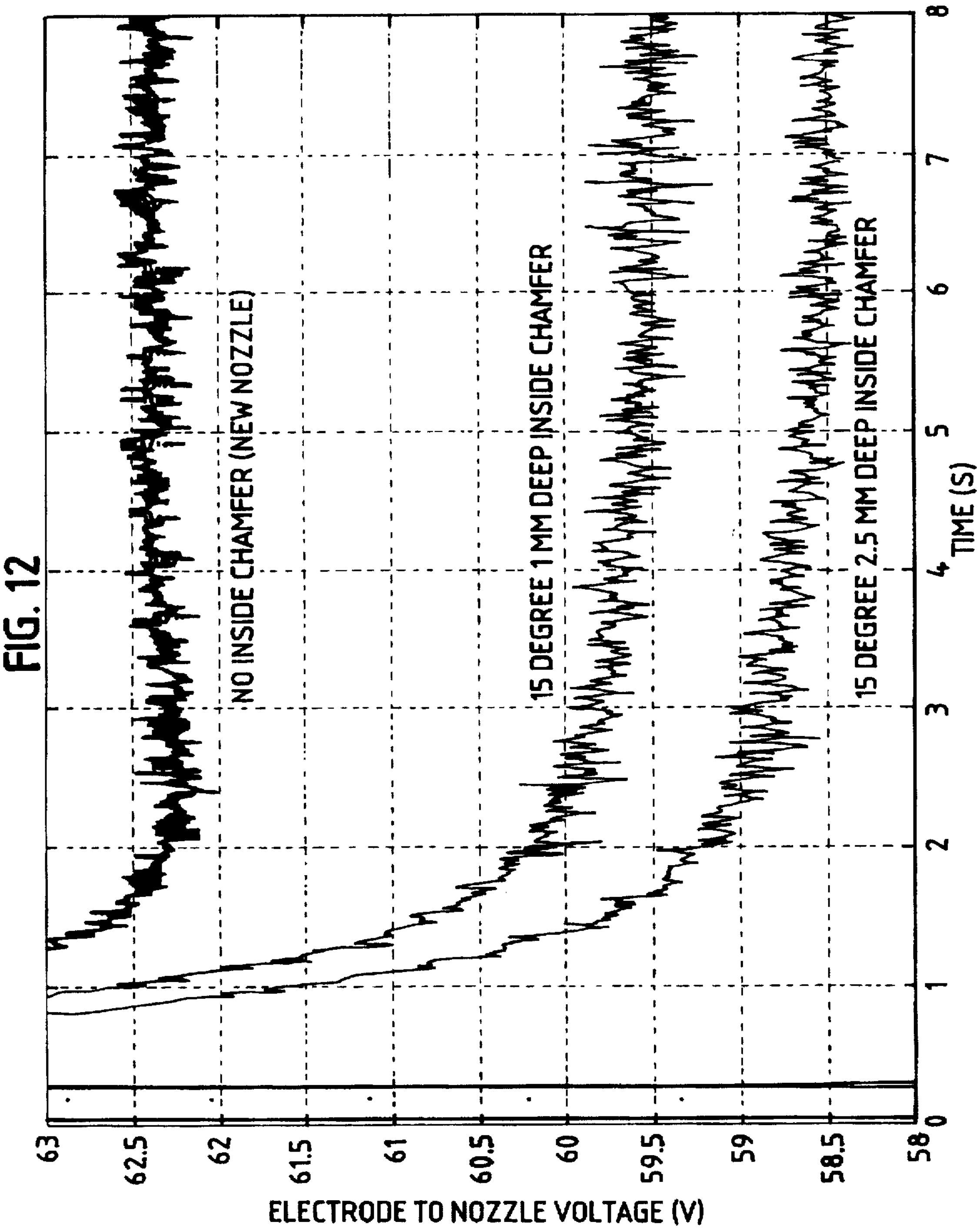
Figure 13:
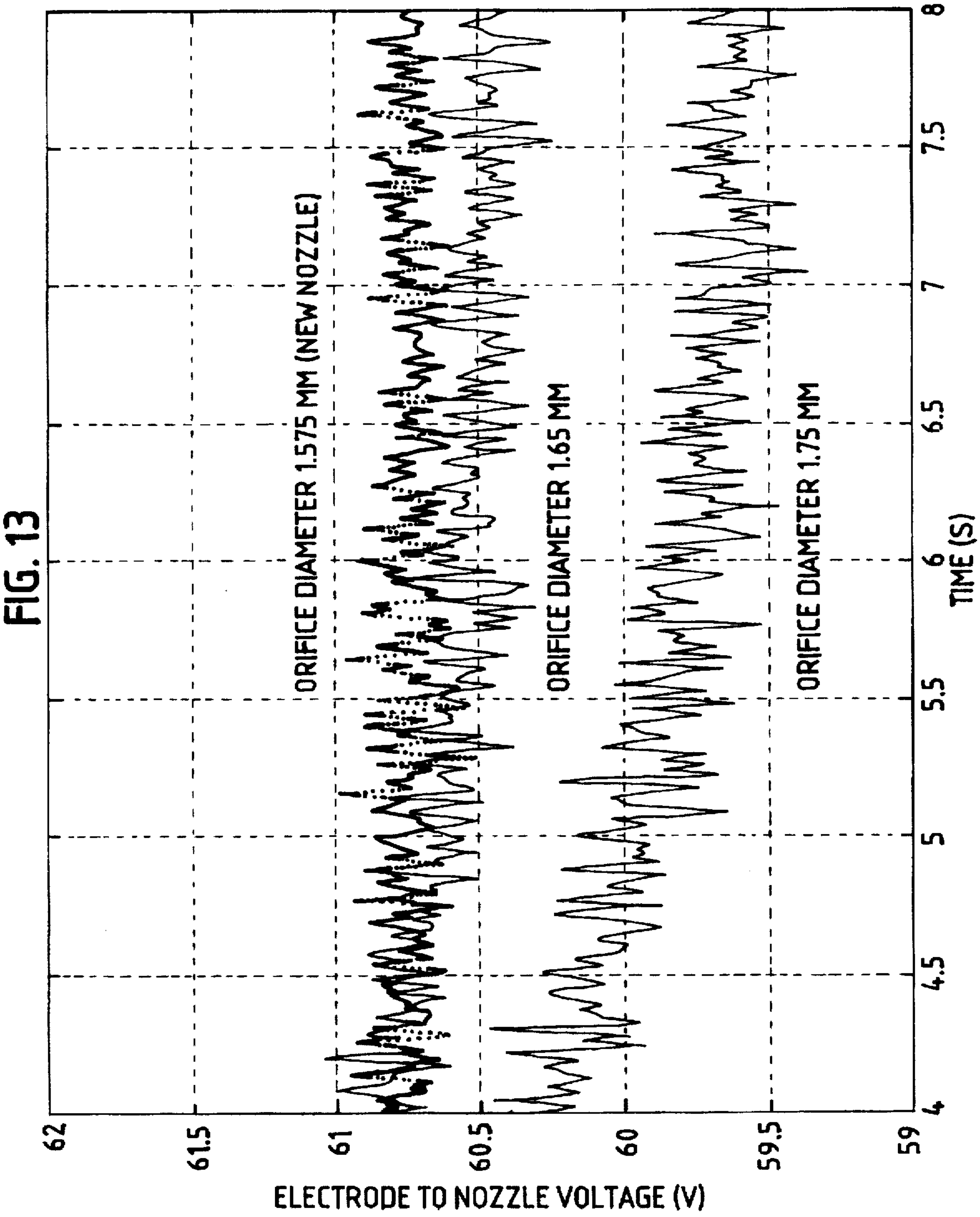

The degree of electrode wear is reflected in the electrode to nozzle voltage, as shown in FIG. 10. However, the electrode to nozzle voltage is affected by axisymmetric nozzle wear and the degree of this wear, as shown in FIGS. 11 and 12 for nozzle erosion type (ii) and in FIG. 13 for nozzle erosion type (iii). Therefore, in order to determine the degree of electrode erosion from the electrode to nozzle voltage, a correction factor for this voltage has to be determined based on the degree of axisymmetric nozzle wear. The latter degree is determined from the pressure measurement. The correction factor is the amount of the electrode to nozzle voltage decrease due to the given axisymmetric nozzle wear. The correction factor is added to the measured electrode to nozzle voltage. The resulting value of the voltage takes into account the increase, due to the electrode erosion, above the nominal value of the electrode to nozzle voltage (i.e. the value of the electrode to nozzle voltage for new consumables) but does not include the decrease due to the axisymmetric nozzle wear. Thus the corrected electrode to nozzle voltage is a measure of the degree of the electrode wear. For example, for the Hypertherm MAX200 Machine Torch operating at 100 A current with 100 A nozzle, 24 psi preflow air plasma gas pressure and 60 psi preflow air shield gas pressure, if the pressure in the gas line during cutting and in steady state is greater than 45 psi then the degree of axisymmetric nozzle wear is not significant and the corresponding electrode to nozzle correction factor is 3 V; if, however, the pressure is less than 45 psi, then the degree of axisymmetric nozzle wear is significant and the corresponding electrode to nozzle correction factor is 6 V.

Figure 14:
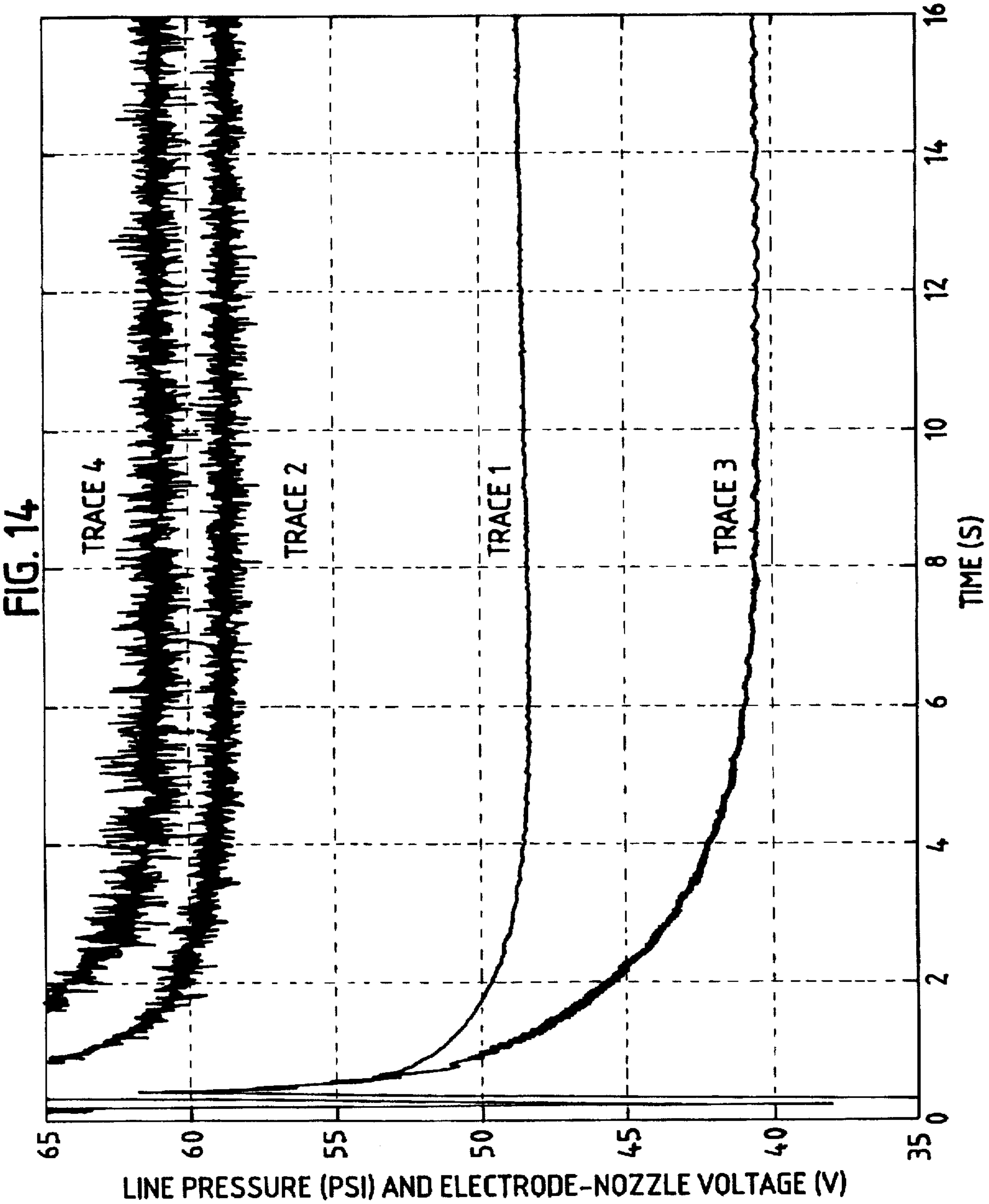
FIG. 14 is a graph for use in determining the degree of axisymmetric nozzle wear and the degree of electrode wear, and FIGS. 15(*a*) to (*d*) and 16(*a*) and (*b*) illustrate apparatus set-ups for the invention.

An example of determining the degree of the axisymmetric nozzle wear and the degree of the electrode wear for the above mentioned equipment and conditions will now be described with reference to FIG. 14. Trace 1 in FIG. 14 shows pressure in the plasma gas line for a good nozzle and electrode; the corresponding electrode to nozzle voltage is marked as Trace 2. Assume that the degree of erosion is to be determined from the measurements of the line pressure Trace 3 and the electrode to nozzle voltage Trace 4. The line pressure (Trace 3) indicates a significant degree of axisymmetric nozzle wear (the line pressure is smaller than 45 psi). The corresponding correction factor for the electrode to nozzle wear is 6 V. The steady state corrected electrode to nozzle voltage mean value is about 67 V. The steady state value of the electrode to nozzle voltage for a new nozzle and new electrode is about 60 V. Comparing the corrected voltage of 67 V to nominal voltage of 60 V indicates a depth of electrode erosion of about 1.4 mm. i.e. a significant degree of electrode wear. The actual erosion depth for this electrode was 1.5 mm.

The condition of the nozzle and the electrode can be determined in an on-line or off-line mode. Torch condition monitoring apparatus according to the invention measures the voltages and pressure, performs suitable signal preprocessing (isolation and scaling), signal processing (filtering, offset adjustment) and determines the condition of the torch nozzle and/or electrode based on a comparison with voltage and pressure values corresponding to a nozzle and electrode in good condition.

Figures 15A, 15B, 15C, 15D:
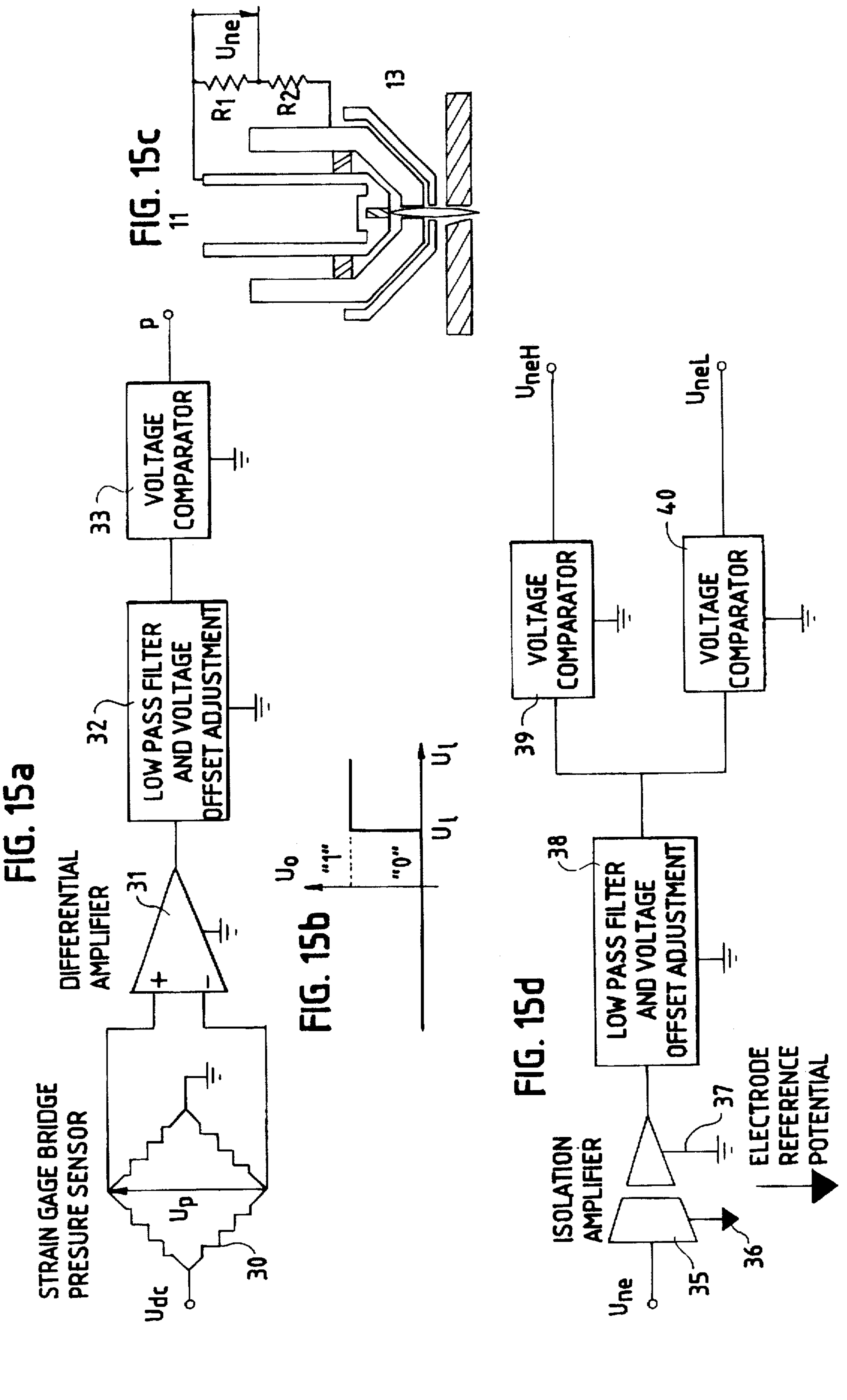

A functional diagram of a measurement apparatus for the detection of axisymmetric nozzle wear and electrode wear is depicted in FIG. 15(*a*).

Pressure in the plasma gas line is measured by a strain gauge bridge pressure sensor 30 which produces voltage difference $U_p$ proportional to the pressure; this difference is obtained on the output of a differential amplifier 31, and optionally filtered and offset adjusted as indicated at 32. The output of a voltage comparator 33, p, indicates if the pressure is greater (p is high-logical "1" or "true") or smaller (p is low-logical "0" or "false") than a threshold value $U_t$ corresponding to e.g. 45 psi for the Hypertherm MAX200 Machine Torch with 100 A nozzle—see FIG. 15(*b*). Thus, the value of p indicates the absence or presence of axisymmetric nozzle wear.

The electrode 11 to nozzle 13 voltage $U_{ne}$ can be scaled down by a resistor voltage divider as shown in FIG. 15(*c*) ($R_l$=200 Ω and $R_2$=10,000 Ω). The electrode to nozzle voltage ($U_{ne}$) input of the apparatus is electrically isolated from the rest of the apparatus by an isolation amplifier 35—see FIG. 15(*d*). The reference potential 36 of the input stage of the isolation amplifier 35 is that of the electrode 11. The reference potential of the output stage of the isolation amplifier is that of the rest of the measurement apparatus and can be grounded as indicated at 37. The isolation amplifier 35 is followed by an optional low pass filter (e.g. third order Bessel filter with the cutoff frequency of 5 Hz) and voltage offset adjustment circuit 38. A voltage comparator 39 having output $U_{neH}$ has the threshold voltage $U_H$ set to a higher value than the threshold value $U_L$ of a comparator 40 with output $U_{neL}$. These threshold values have to be determined experimentally. For example, for the Hypertherm MAX200 Machine Torch with 100 A nozzle and −0.6 V offset adjustment the threshold values are 3.2 V and 2.25 V.

Such apparatus can also incorporate the invention described in the applicant's above-mentioned co-pending application for determining non-axisymmetric wear of a nozzle. In this co-pending application, a probe, which may be formed by segmenting the shield 17 of a torch, may be used to measure an electrical parameter associated with the plasma jet to determine whether there is any deflection of the jet, such deflection (if any) being caused by and thus indicative of non-axisymmetric wear (for example grooving) of the nozzle. In particular, voltages are measured between the torch nozzle (or electrode) and individual segments of the probe ($U_{pni}$) and given that $U_{pni}$ increases at the segments towards which the plasma jet is deflected and decreases at the opposite segments, it is possible to detect any deflection of the jet. Thus voltage differences between opposite segments are subtracted and compared to threshold values for these differences corresponding to a good nozzle. For example, for a 4 segment probe $\Delta U_{pn13}=U_{pn1}-U_{pn3}$, and $\Delta U_{pn24}=U_{pn2}-U_{pn4}$, are determined and compared with threshold values.

In an alternative method also described in the above-mentioned copending application, non-axisymmetric wear of the nozzle may be detected by measuring the nozzle (or electrode) to workpiece voltage while operating the torch and while relatively rotating the torch and workpiece. Effectively, when non-axisymmetric wear of the nozzle is present, the relative rotation of the torch and workpiece causes the length of the arc to vary which is detected by the voltage measurement. In an off-line adaptation of this method, the workpiece is replaced by a rotatable frustro-conical shaped electrode such that the arc root (anode spot) attaches to the sloping surface thereof. This electrode is constructed and operated to ensure it is not penetrated by the arc. Thus a torch condition monitoring apparatus may be provided in which the apparatus described hereinabove, and the apparatus described in the beforementioned co-pending application are combined.

Figure 16A:
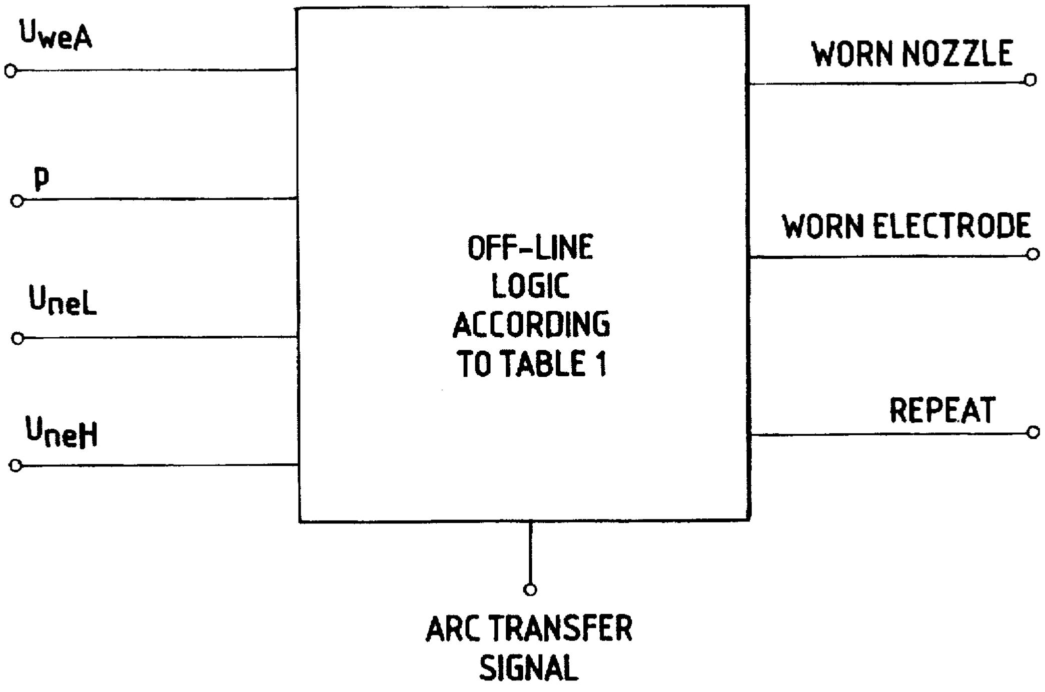
Figure 16B:
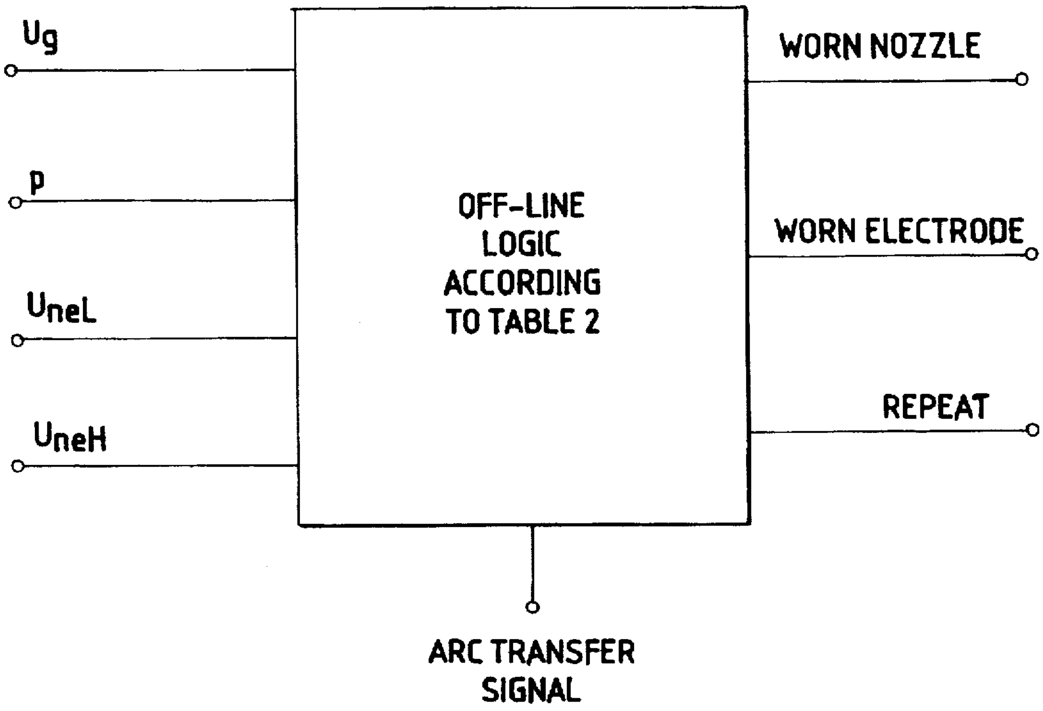

The torch condition monitoring can be performed either in an off-line mode or on-line mode. A binary assessment of the consumables' condition (i.e., consumable worn or good) is based on the outputs of the comparators of the measurement apparatus described above, as shown in FIGS. 16(*a*) and (*b*). The assessment may be performed according to the truth tables given herein (see Table 1 for off-line condition monitoring and Table 2 for on-line condition monitoring). The test is synchronised by an arc transfer signal indicating that the arc has transferred to the workpiece (in the transferred arc plasma cutting system). In order for the signals to reach steady state, delay of minimum 2 seconds between the arc transfer and the test is needed for the Hypertherm MAX200 Machine Torch with 100 A nozzle.

For off-line condition monitoring, comparisons can be performed according to the truth table shown in Table 1, where $U_{weA}$ is the electrode to workpiece voltage peak to peak amplitude comparator output, $U_{neL}$ is the electrode to nozzle voltage low comparator output, $U_{neH}$ is the electrode to nozzle voltage high comparator output and p is the plasma gas pressure comparator output; 0 means signal value smaller than the threshold and 1 means signal value greater than the threshold.

TABLE 1

Truth table for the off-line torch condition monitoring

| $U_{wcA}$ | $U_{ncL}$ | $U_{ncH}$ | p | worn nozzle | worn electrode | repeat test |
|---|---|---|---|---|---|---|
| 0 | 0 | 0 | 0 | yes | no | no |
| 0 | 0 | 0 | 1 | no | no | yes |
| 0 | 0 | 1 | 0 | no | no | yes |
| 0 | 0 | 1 | 1 | no | no | yes |
| 0 | 1 | 0 | 0 | yes | yes | no |
| 0 | 1 | 0 | 1 | no | no | no |
| 0 | 1 | 1 | 0 | yes | yes | no |
| 0 | 1 | 1 | 1 | no | yes | no |
| 1 | 0 | 0 | 0 | yes | no | no |
| 1 | 0 | 0 | 1 | no | no | yes |
| 1 | 0 | 1 | 0 | no | no | yes |
| 1 | 0 | 1 | 1 | no | no | yes |
| 1 | 1 | 0 | 0 | yes | yes | no |
| 1 | 1 | 0 | 1 | yes | no | no |
| 1 | 1 | 1 | 0 | yes | yes | no |
| 1 | 1 | 1 | 1 | yes | yes | no |

For on-line condition monitoring comparisons can be performed according to the truth table shown in Table 2, where $U_g$ is the output of Boolean OR function of two arguments: the outputs of the comparators for $\Delta U_{pn13}$ and $\Delta U_{pn24}$.

TABLE 2

Truth table for the on-line torch condition monitoring

| $U_g$ | $U_{ncL}$ | $U_{ncH}$ | p | worn nozzle | worn electrode | repeat test |
|---|---|---|---|---|---|---|
| 0 | 0 | 0 | 0 | yes | no | no |
| 0 | 0 | 0 | 1 | no | no | yes |
| 0 | 0 | 1 | 0 | no | no | yes |
| 0 | 0 | 1 | 1 | no | no | yes |
| 0 | 1 | 0 | 0 | yes | yes | no |
| 0 | 1 | 0 | 1 | no | no | no |
| 0 | 1 | 1 | 0 | yes | yes | no |
| 0 | 1 | 1 | 1 | no | yes | no |
| 1 | 0 | 0 | 0 | yes | no | no |
| 1 | 0 | 0 | 1 | no | no | yes |
| 1 | 0 | 1 | 0 | no | no | yes |
| 1 | 0 | 1 | 1 | no | no | yes |
| 1 | 1 | 0 | 0 | yes | yes | no |
| 1 | 1 | 0 | 1 | yes | no | no |
| 1 | 1 | 1 | 0 | yes | yes | no |
| 1 | 1 | 1 | 1 | yes | yes | no |

The result of the comparison can be displayed in the form of information for an operator about the condition of the torch nozzle and electrode and/or can be used to stop the cutting operation automatically and initiate automatic change of the torch.

The above methods for determination of the binary status of the consumables typically require one comparator for a given signal (e.g. for the plasma gas line pressure). In order to determine the degree of consumables' wear rather than the binary status of the consumables, additional comparators are needed in the measurement apparatus. These comparators provide additional discretisation levels for the signals necessary to determine the degree of wear. Furthermore, the above mentioned electrode to nozzle correction has to be implemented and the truth tables extended to include more conditions.

Condition monitoring according to the invention has many advantages. The monitoring can be performed on-line during cutting operations or as an off-line test. The measurements are non-intrusive since all the sensors, except for the segmented probe, can be placed in the plasma arc cutting equipment power supply. Electrode and nozzle erosion can be distinguished and even types and degrees of wear can be determined if required.

Persons skilled in the art will appreciate that the invention described herein is susceptible to variations and modifications other than those specifically described and it is to be understood that the invention includes all such variations and modifications which fall within the spirit and scope of the accompanying claims.

We claim:

1. A method for detecting erosion of a nozzle of a plasma arc torch while a plasma jet is being generated by the torch including measuring the pressure of a plasma forming gas supplied to the torch at a location upstream of the nozzle orifice, comparing the measured pressure with a reference pressure value representative of a non-eroded nozzle, wherein a measured pressure value which is less than said reference value indicates the presence of erosion of the nozzle orifice, and additionally measuring an electrical parameter associated with the plasma jet and comparing the measured electrical parameter with a reference value for detecting a change in length of an arc forming the said plasma, wherein the pressure measurement and comparison with a reference value, and the electrical parameter measurement and comparison with a reference value, are used to distinguish between erosion of the nozzle of the torch and erosion of the electrode of the torch.

2. A method as claimed in claim 1 wherein the pressure of a plasma forming gas within the nozzle of the plasma arc torch is measured.

3. A method as claimed in claim 1 wherein the pressure of a plasma forming gas is measured in a supply line downstream of a pressure regulator associated with a supply of the plasma forming gas.

4. A method as claimed in claim 1 wherein the electrical parameter is a voltage.

5. A method as claimed in claim 4 wherein the voltage between an electrode and the nozzle of the plasma arc torch is measured.

6. A method as claimed in claim 1 wherein the measured electrical parameter is compared with an upper and a lower reference value, an unacceptably eroded nozzle and a good relatively un-eroded electrode being indicated if the measured pressure is lower than the reference pressure value while the measured electrical parameter is below the lower of its reference values whereas an unacceptably eroded electrode is indicated if the electrical parameter is above the said lower reference value, a good relatively un-eroded nozzle and a good relatively un-eroded electrode being indicated if the measured pressure is higher than the reference pressure value while the measured electrical parameter is between the said upper and lower reference values whereas an unacceptably eroded electrode is indicated if the measured electrical parameter is above said upper reference value.

7. A method as claimed in claim 1 including determining the degree of wear of the nozzle using the measured pressure value.

8. A method as claimed in claim 1 including determining the degree of wear of the torch electrode using the measured pressure value and the measured electrical parameter.

9. Apparatus for detecting erosion of a nozzle of a plasma arc torch while a plasma jet is being generated by the torch including means for measuring the pressure of a plasma forming gas supplied to the torch at a location upstream of the nozzle orifice and means for comparing a measured pressure value determined by said first mentioned means with a reference pressure value representative of a non-eroded nozzle, wherein a measured pressure value which is less than said reference value indicates the presence of erosion of the nozzle office, and means for measuring an electrical parameter associated with the plasma jet and for comparing said measured electrical parameter with a reference value for determining a change in length of an arc forming the plasma, said electrical parameter measuring means including means for measuring voltage between an electrode and the nozzle of the plasma arc torch, wherein the pressure measuring means, pressure comparing means, electrical parameter measuring means and electrical parameter comparing means functionally distinguish between erosion of the nozzle of the torch and erosion of the electrode of the torch.

10. Apparatus as claimed in claim 9 wherein the pressure measuring means includes a sensor located within the nozzle of the torch.

11. Apparatus as claimed in claim 9 wherein the pressure measuring means includes a sensor located within a gas supply line downstream of a pressure regulator associated with a plasma forming gas supply.

12. Apparatus as claimed in claim 10 or claim 11 wherein the sensor is a strain gauge bridge pressure sensor.

13. Apparatus as claimed in claim 9 wherein the means for comparing a measured pressure value with a reference pressure value provides a binary "1" or "0" output, a "1" output being provided if the measured pressure is higher than the reference value to thereby indicate a good relatively un-eroded nozzle, and a "0" output being provided if the measured pressure is lower than the reference value to thereby indicate a worn unacceptably eroded nozzle.

14. Apparatus as claimed in claim 9 wherein the electrical parameter comparing means provides for comparison of the measured electrical parameter with an upper and a lower reference value.

15. Apparatus as claimed in claim 14 wherein the electrical parameter comparing means provides an output that indicates a good relatively un-eroded electrode if the measured pressure value is lower than the reference pressure value and the measured electrical parameter is below the lower of its reference values; an output that indicates a worn unacceptably eroded electrode if the measured pressure value is lower than the reference pressure value and the measured electrical parameter is above the lower of its reference values; an output that indicates a worn unacceptably eroded electrode if the measured pressure value is higher than the reference pressure value and the measured electrical parameter is above the upper of its reference values; and an output that indicates a good relatively un-eroded electrode if the measured pressure value is higher than the reference pressure value and the measured electrical parameter is between the upper and lower of its reference values.

16. Apparatus as claimed in claim 9 wherein the pressure comparing means and the electrical parameter comparing means provide outputs for indicating, respectively, the degree of wear of the nozzle and the degree of wear of the electrode.

* * * * *